United States Patent
Wang et al.

(10) Patent No.: US 9,332,526 B2
(45) Date of Patent: May 3, 2016

(54) DISCOVERING AN EVOLVED MULTICAST BROADCAST MULTIMEDIA SERVICE IN SINGLE OR DUAL BAND LTE

(75) Inventors: Jun Wang, La Jolla, CA (US); Srinivasan Balasubramanian, San Diego, CA (US); Andrea Garavaglia, Bavaria (DE); Jack S. Shauh, San Diego, CA (US); Arvind Swaminathan, San Diego, CA (US); Gordon Kent Walker, Poway, CA (US); Daphna Zeilingold, San Diego, CA (US); Xiaoxia Zhang, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 262 days.

(21) Appl. No.: 13/346,936

(22) Filed: Jan. 10, 2012

(65) Prior Publication Data

US 2013/0107721 A1 May 2, 2013

Related U.S. Application Data

(60) Provisional application No. 61/553,116, filed on Oct. 28, 2011.

(51) Int. Cl.
*H04W 4/06* (2009.01)
*H04W 72/00* (2009.01)
*H04W 68/00* (2009.01)

(52) U.S. Cl.
CPC ............ *H04W 72/005* (2013.01); *H04W 68/00* (2013.01)

(58) Field of Classification Search
CPC .......... H04J 3/14; H04L 43/50; H04L 43/00; H04L 43/0852; H04L 43/08; H04L 5/14; H04B 17/00; H04B 17/003; H04B 7/2643; H04W 24/00; H04W 80/04; H04W 84/12; H04W 88/06; H04W 88/08; H04W 84/18; H04Q 11/08

USPC ........ 370/241, 252, 280, 328, 337, 347, 375, 370/376, 458; 455/458, 574
See application file for complete search history.

(56) References Cited

U.S. PATENT DOCUMENTS

| | | | |
|---|---|---|---|
| 6,865,398 B2 * | 3/2005 | Mangal et al. ............. | 455/552.1 |
| 8,135,419 B2 * | 3/2012 | Wang et al. ................... | 455/458 |

(Continued)

FOREIGN PATENT DOCUMENTS

| | | |
|---|---|---|
| EP | 2001252 A1 | 12/2008 |
| JP | 2007521777 A | 8/2007 |

(Continued)

OTHER PUBLICATIONS

Alcatel et al: "Discussion about E-MBMS on dedicated carrier", Internet Citation, Aug. 28, 2006. XP002475133. Retrieved from the Internet:URL:http://www.3gpp.org/ftpjtsg%5Fran/WG2%5FRL2/ TSGR2%5F54/Documents/ [retrieved on Apr. 4, 2008].
International Search Report and Written Opinion—PCT/US2012/ 061348—ISA/EPO—Jan. 16, 2013.
LTE: Evolved Universal Terrestrial Radio Access (E-UTRA), Radio Resource Control (RRC), Protocol specification (3GPP TS 36.331 version 10.0.0 Release 10), Technical Specification, European Telecommunications Standards Institute (ETSI) , 650, Route Des Lucioles; F-06921, Sophia-Antipolis, France, vol. 3GPP RAN 2, No. V10.0.0, Jan. 1, 2011, XP014062152.

(Continued)

*Primary Examiner* — Mang Yeung
*Assistant Examiner* — Natali N Pascual Peguero
(74) *Attorney, Agent, or Firm* — Arent Fox LLP

(57) ABSTRACT

A method, an apparatus, and a computer program product for wireless communication are provided. The apparatus monitors a page during a current paging cycle on a first frequency. In addition, the apparatus switches to a second frequency after the current paging cycle to receive multicast/broadcast information on the second frequency. Furthermore, the apparatus attempts to receive the multicast/broadcast information on the second frequency before a predetermined time.

31 Claims, 17 Drawing Sheets

(56) References Cited

U.S. PATENT DOCUMENTS

| | | | |
|---|---|---|---|
| 2003/0088695 A1* | 5/2003 | Kwak | H04W 68/00 709/238 |
| 2006/0126590 A1* | 6/2006 | Putcha et al. | 370/343 |
| 2008/0268878 A1 | 10/2008 | Wang et al. | |
| 2010/0074159 A1 | 3/2010 | Yamada et al. | |
| 2010/0080159 A1 | 4/2010 | Hu et al. | |
| 2010/0091720 A1* | 4/2010 | Chun et al. | 370/329 |
| 2010/0159959 A1* | 6/2010 | Santhanam et al. | 455/458 |
| 2010/0272004 A1 | 10/2010 | Maeda et al. | |
| 2011/0103288 A1 | 5/2011 | Lee et al. | |
| 2011/0130100 A1 | 6/2011 | Chen et al. | |
| 2011/0176483 A1* | 7/2011 | Palanki et al. | 370/328 |
| 2011/0194428 A1 | 8/2011 | Wang et al. | |

FOREIGN PATENT DOCUMENTS

| | | |
|---|---|---|
| JP | 2009182944 A | 8/2009 |
| JP | 2010502054 A | 1/2010 |
| KR | 20090055599 A | 6/2009 |
| WO | 2008044451 A1 | 4/2008 |
| WO | 2008082572 A1 | 7/2008 |

OTHER PUBLICATIONS

MEDIATEK., "Acquisition of MBMS parameters", 3GPP Draft, R2-104435, 3rd Generation Partnership Project (3GPP), Mobile Competence Centre, 650, Route Des Lucioles, F-06921 Sophia-Anti Polis Cedex, France, vol. RAN WG2, No. Madrid, Spain, Aug. 23, 2010, Aug. 17, 2010, XP050451857, [retrieved on Aug. 17, 2010].

Alcatel: "Discussion of MBMS dedicated cell and paging configuration", 3GPP TSG-RAN WG2 Meeting #55, R2-063284, Nov. 10, 2006, 4 Pages.

Alcatel Shanghai Bell: "Discussion about E-MBMS on dedicated carrier" 3GPP TSG-RAN WG2 Meeting #54 R2-062056, Sep. 1, 2006, 8 Pages.

English language Translation of the Notice of Grounds for Rejection from counterpart Korean Patent Application No. 2014-7014152, dated Jun. 17, 2015, 6 pages.

English language Translation of Office Action for Japanese Patent Application No. 2014-538863 dated Apr. 21, 2015, 9 pages.

* cited by examiner

DISCOVERING AN EVOLVED MULTICAST BROADCAST MULTIMEDIA SERVICE IN SINGLE OR DUAL BAND LTE

CROSS-REFERENCE TO RELATED APPLICATION(S)

This application claims the benefit of U.S. Provisional Application Ser. No. 61/553,116, entitled "DISCOVERING AN EVOLVED MULTICAST BROADCAST MULTIMEDIA SERVICE IN SINGLE OR DUAL BAND LTE" and filed on Oct. 28, 2011, which is expressly incorporated by reference herein in its entirety.

BACKGROUND

1. Field

The present disclosure relates generally to communication systems, and more particularly, to discovering evolved Multicast Broadcast Multimedia Service (eMBMS) in single or dual band Long Term Evolution (LTE).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is LTE. LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus monitors a page during a current paging cycle on a first frequency. In addition, the apparatus switches to a second frequency after the current paging cycle to receive multicast/broadcast information on the second frequency. Furthermore, the apparatus attempts to receive the multicast/broadcast information on the second frequency before a predetermined time.

DETAILED DESCRIPTION

Figure 1:
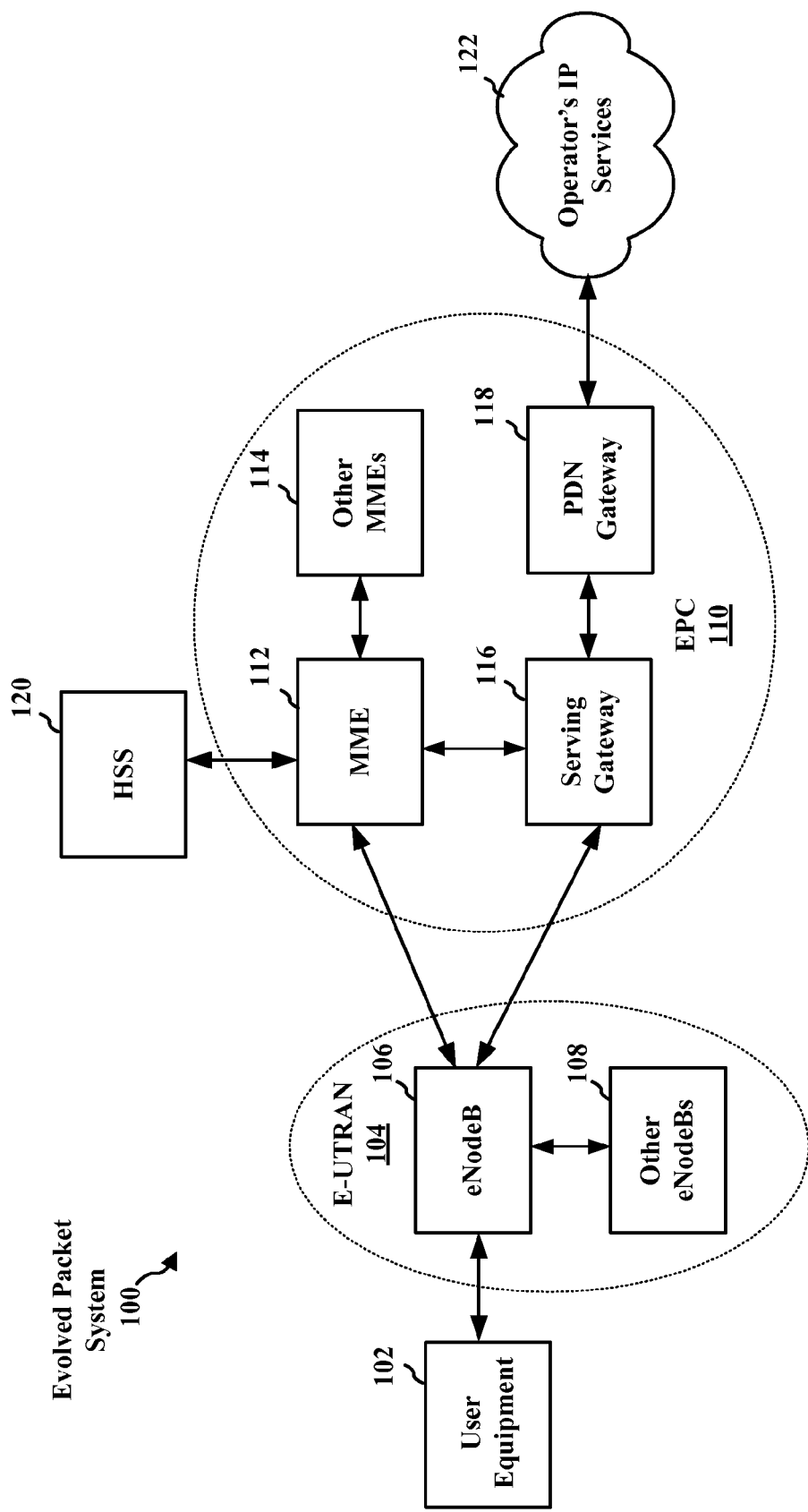
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
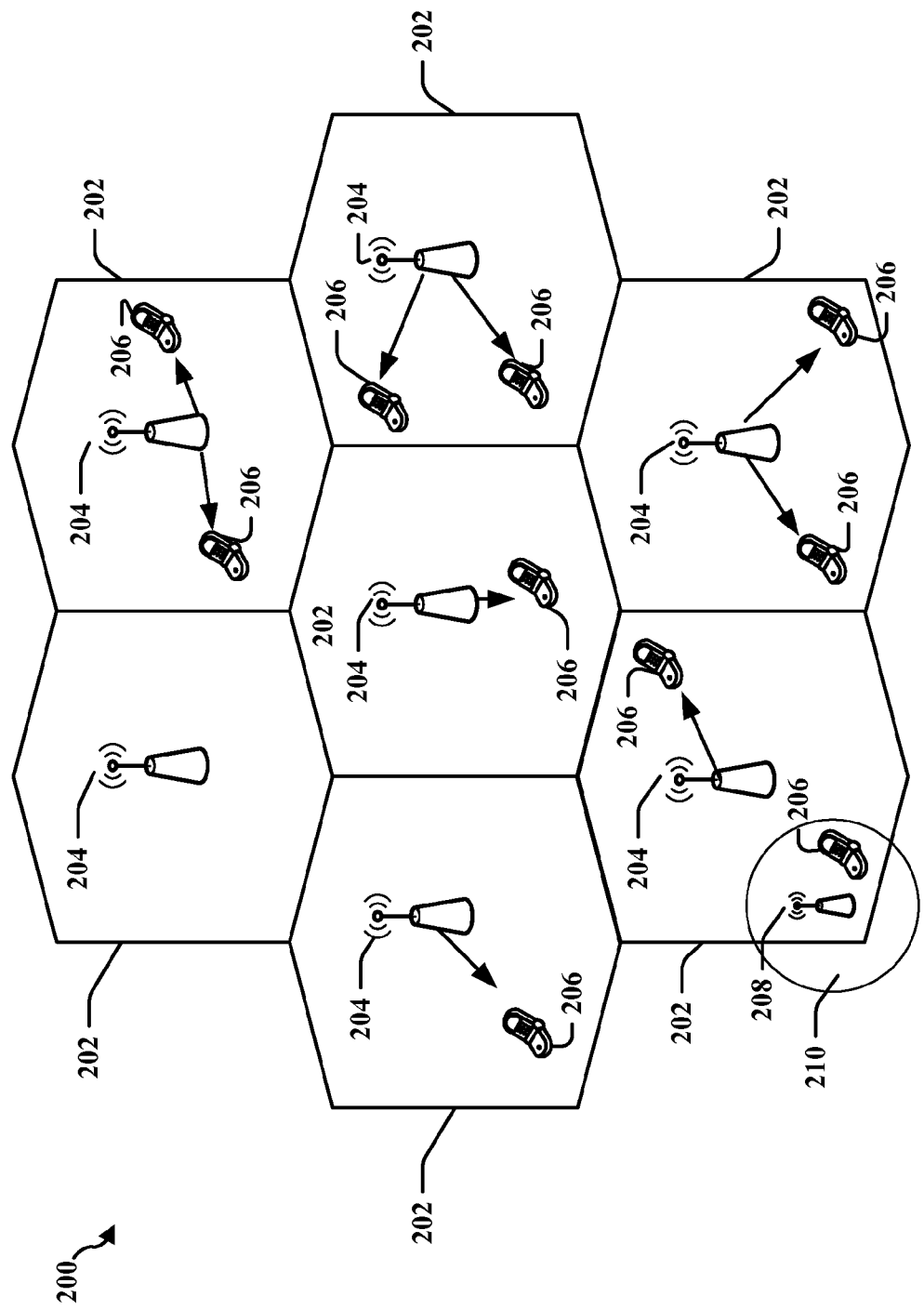
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
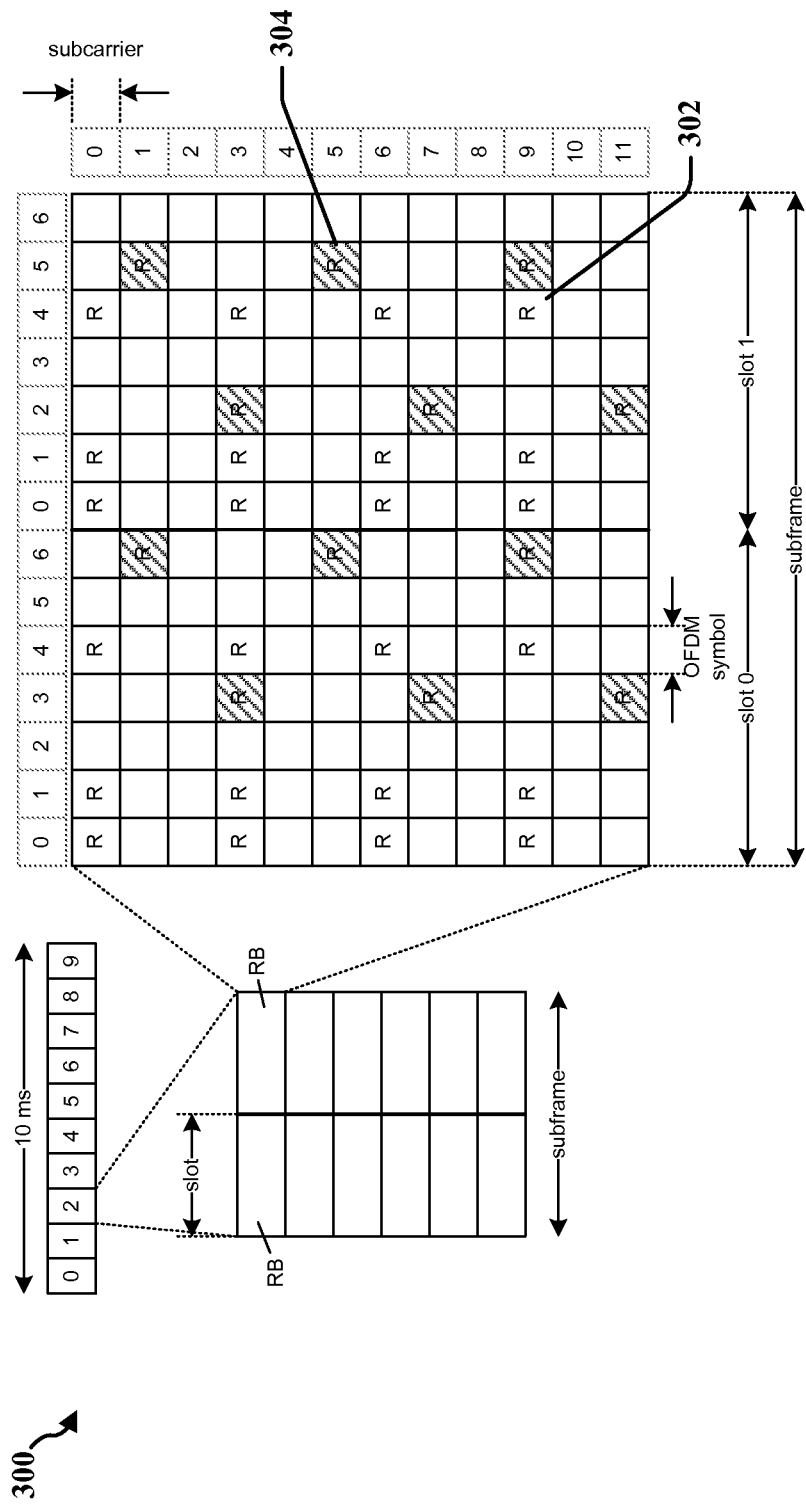
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
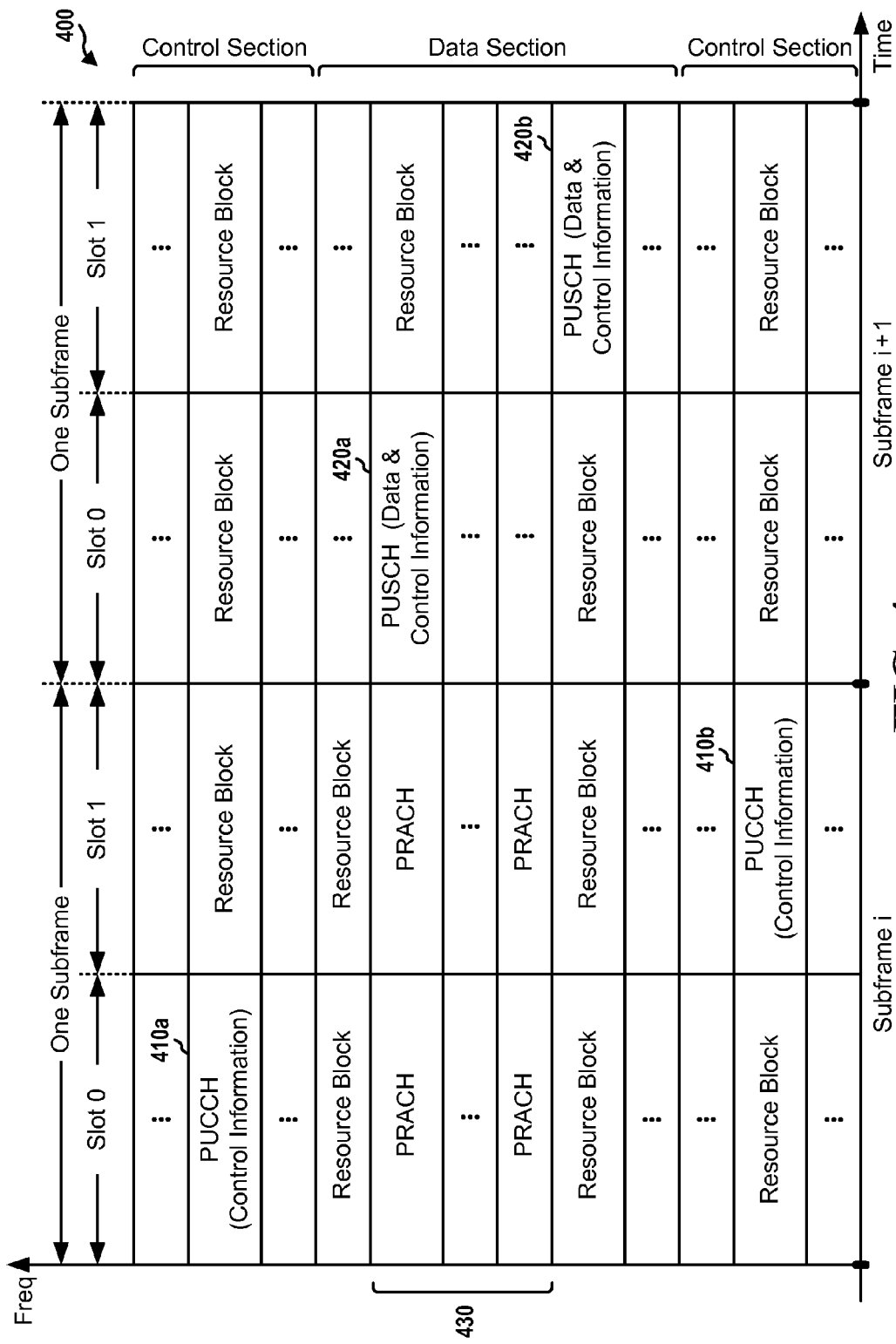
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
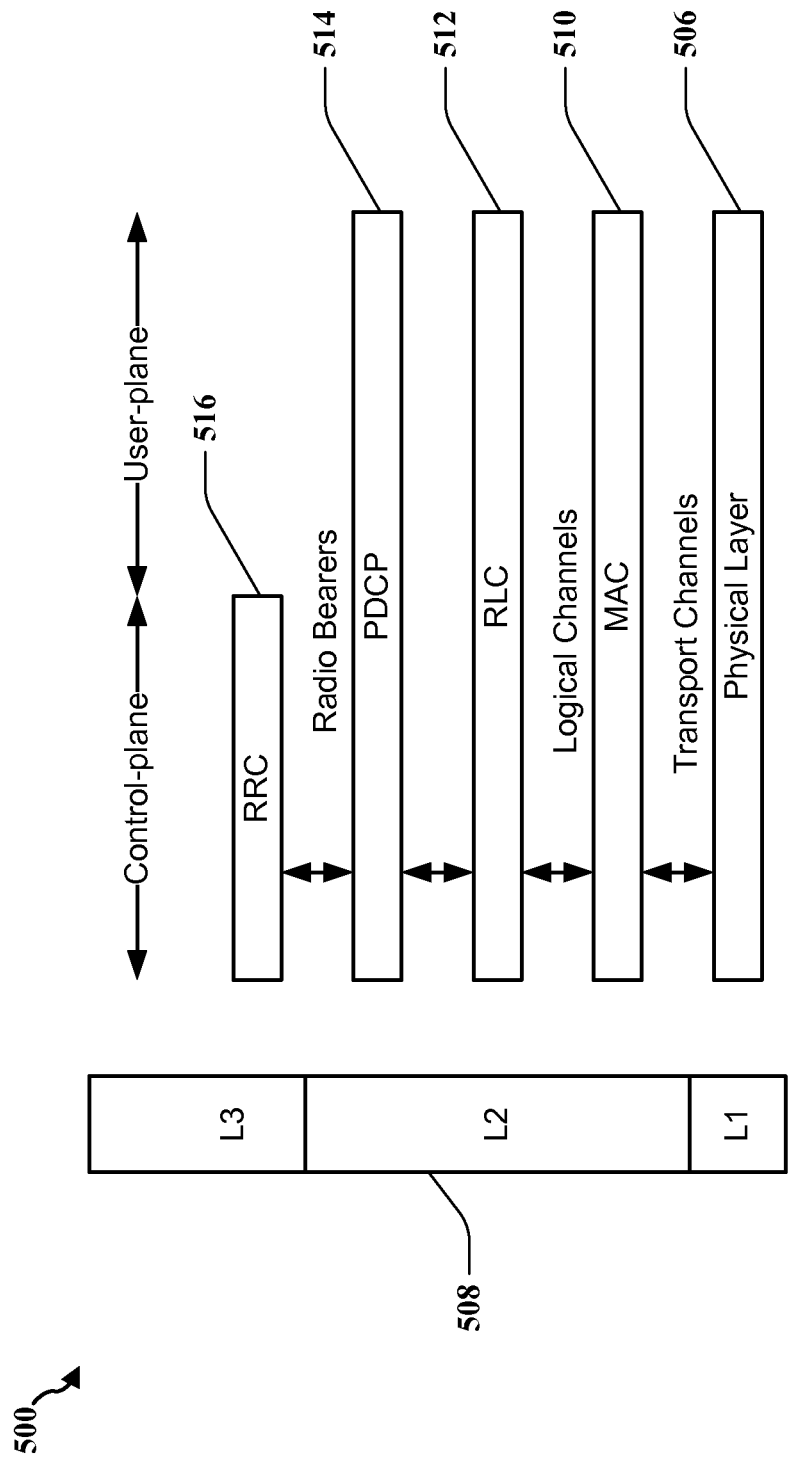
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
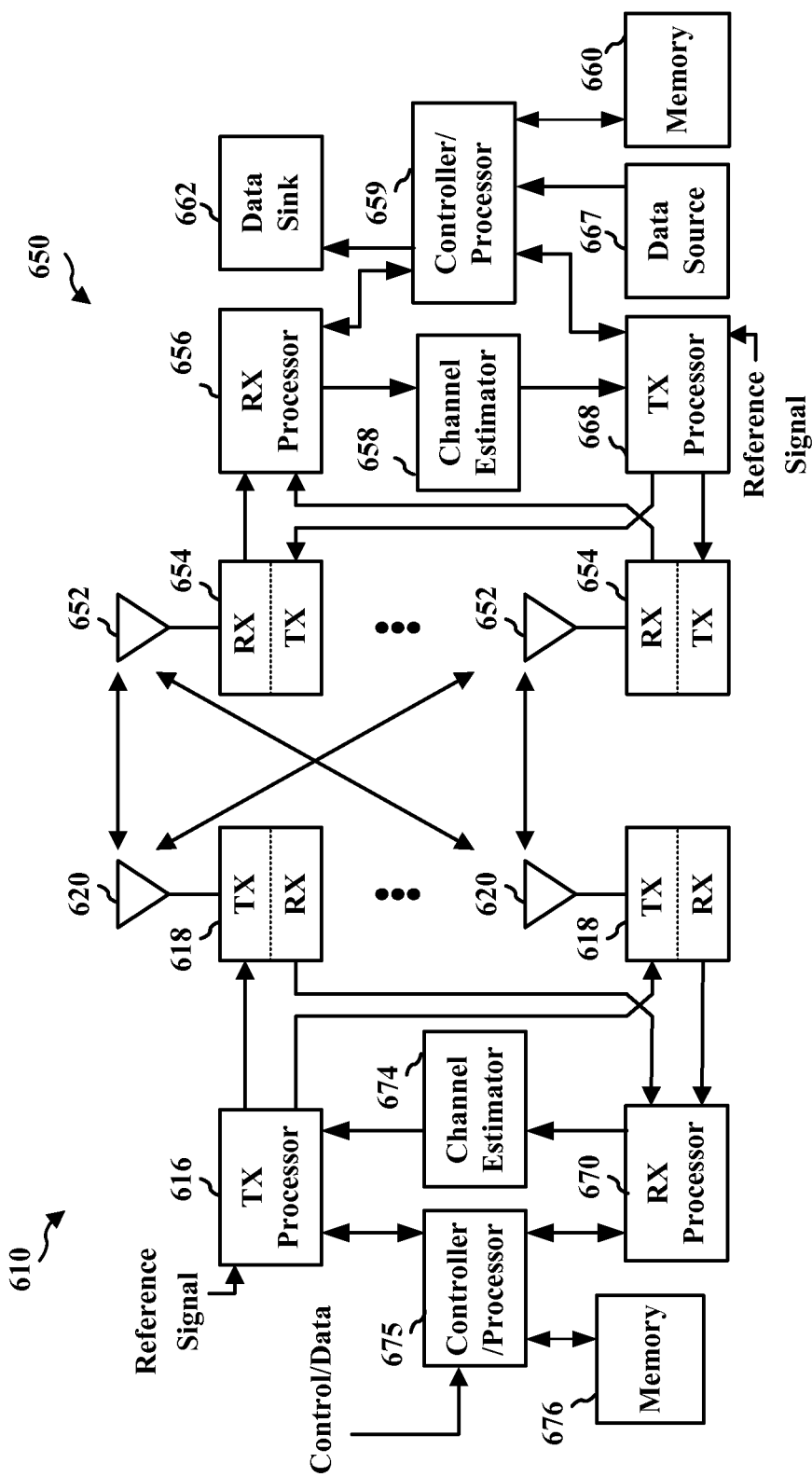
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
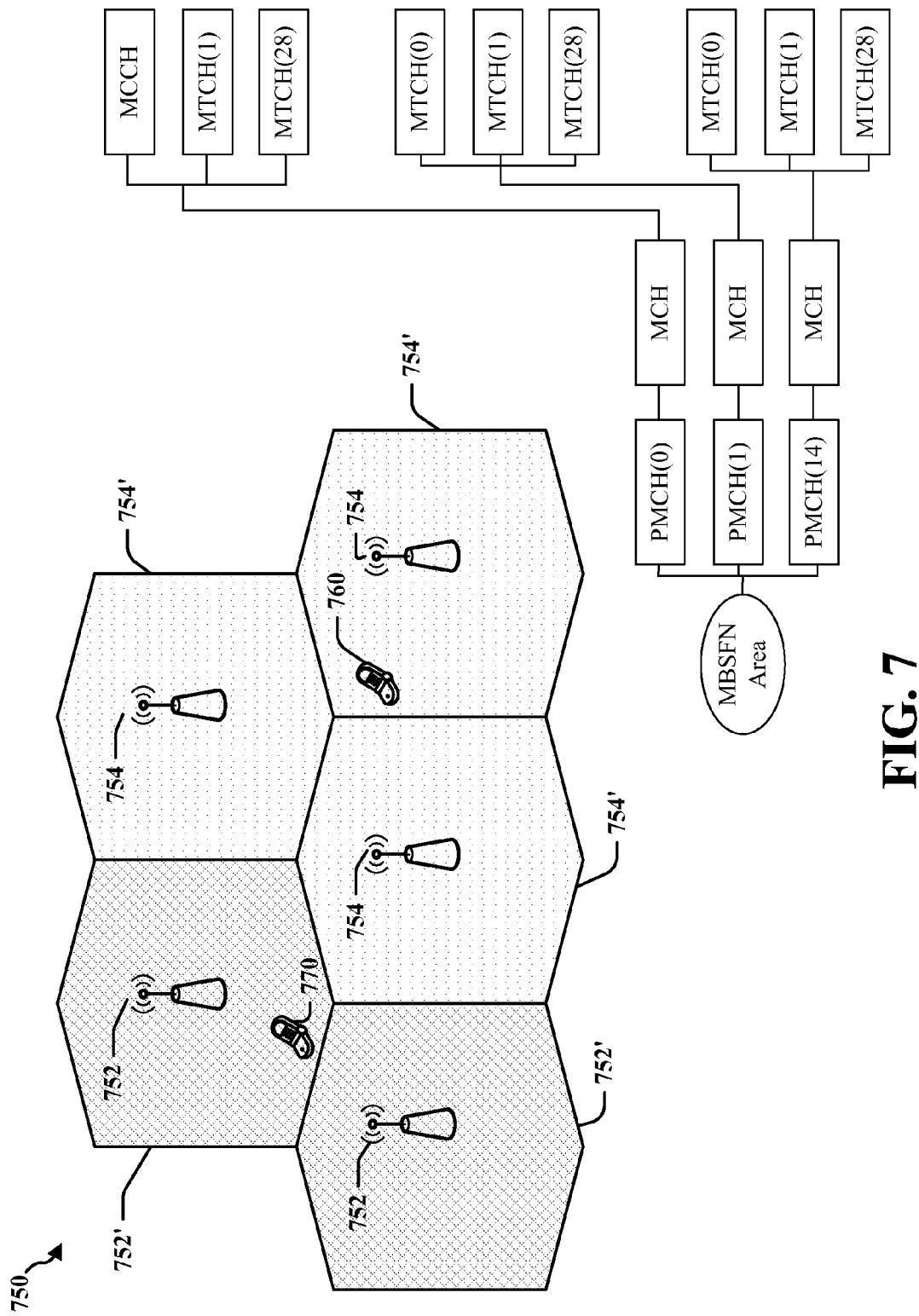
FIG. 7 is a diagram illustrating evolved Multicast Broadcast Multimedia Service in a Multi-Media Broadcast over a Single Frequency Network.

FIG. 7 is a diagram 750 illustrating evolved Multicast Broadcast Multimedia Service (eMBMS) in a Multi-Media Broadcast over a Single Frequency Network (MBSFN). The eNBs 752 in cells 752' may form a first MBSFN area and the eNBs 754 in cells 754' may form a second MBSFN area. The eNBs 752, 754 may be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

Figure 8:
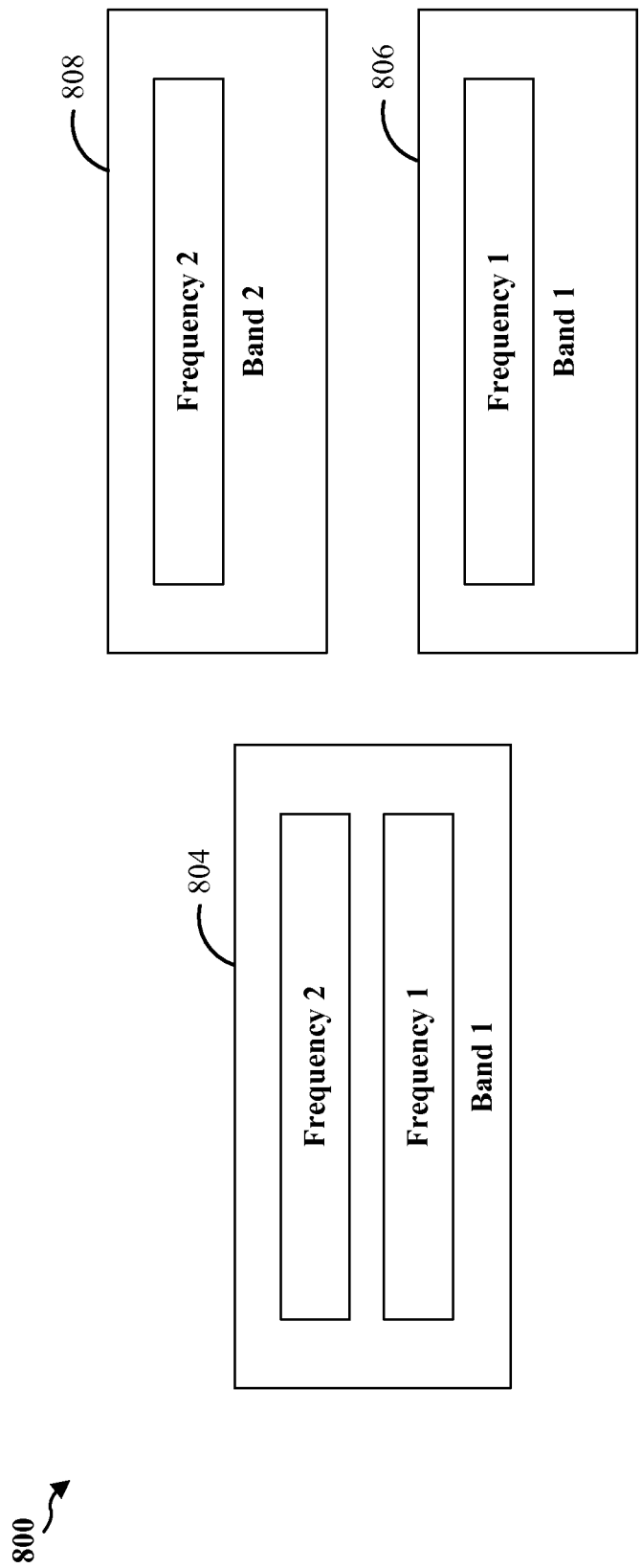
FIG. 8 is a diagram illustrating first and second frequencies on one or two bands.

FIG. 8 is a diagram 800 illustrating first and second frequencies on one or two bands. A UE camped on an LTE cell on a frequency can discover the availability of an eMBMS service on the frequency by first acquiring a system information block 13 (SIB13). The SIB13 indicates notification information and an MBSFN area identifier (ID) for each MBSFN area supported by the cell. In addition, the SIB13 includes information needed for acquiring the MBSFNAreaConfiguration message on the MCCH. The MBSFNAreaConfiguration message includes various information, including a temporary mobile group identity (TMGI) and an optional session ID for each MTCH. Methods are provided infra for allowing a UE to discover eMBMS services on multiple frequencies, such as on a first frequency and a second frequency. The first frequency may be associated with a first cell/eNB and the second frequency may be associated with a second cell/eNB that is different than the first cell/eNB. The first and second frequencies may be on a single band/frequency channel 804. Alternatively, the first and second frequencies may be on different bands/frequency channels, such as the bands 806, 808, respectively. The methods apply to a UE that is not receiving an eMBMS service while in the RRC_IDLE state (unicast is idle) and to a UE that is receiving an eMBMS service while in the RRC_IDLE state (unicast is idle).

When a UE is in an RRC_IDLE state on a first frequency and is not receiving an eMBMS service on the first frequency, the UE may switch to a second frequency to discover an eMBMS service on the second frequency, but should monitor for the paging message periodically for unicast communication on the first frequency. When a UE is receiving an eMBMS service on the first frequency (while in an RRC_IDLE state), the UE may switch to a second frequency to discover an eMBMS service on the second frequency, but should be able to monitor the SIB13 and all the MCCHs on the first frequency for the eMBMS service on the first frequency.

Figure 9:
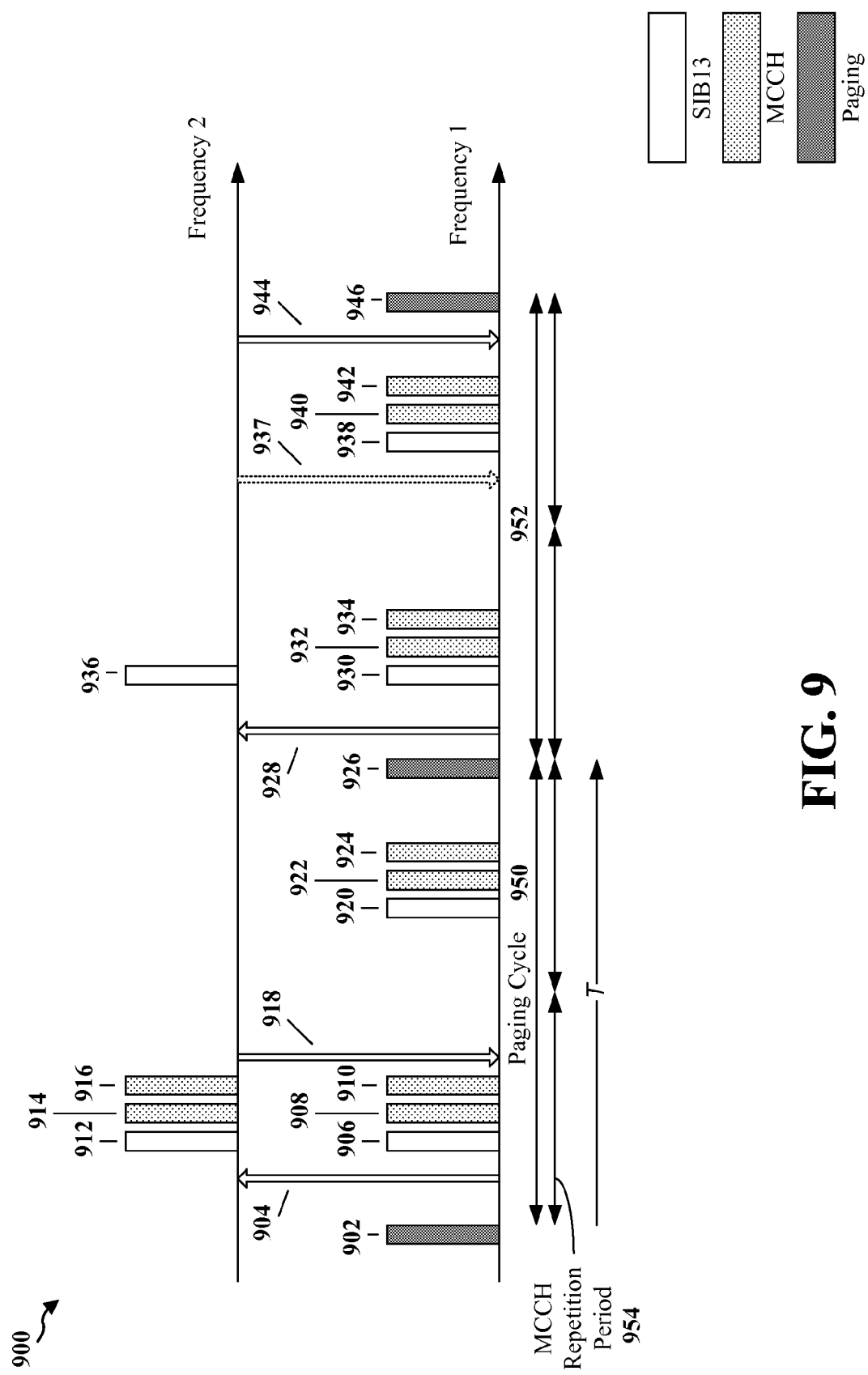
FIG. 9 is a diagram for illustrating an exemplary method of discovering an eMBMS service in LTE.

FIG. 9 is a diagram 900 for illustrating an exemplary method of discovering an eMBMS service in LTE. The paging occasions 902, 926, 946 are separated by a paging cycle/interval. In a first paging cycle 950 after the UE monitors for the paging message 902 (and a time period T before the starting time of an eMBMS service on the second frequency), the UE refrains from receiving the SIB13 906 and all the MCCHs 908, 910 on the first frequency of a first cell, switches 904 to the second frequency of a second cell, and sets a latest time (or time period) to return to the first frequency. The latest time to return to the first frequency is a time before the next paging occasion 926 such that the UE may monitor the paging occasion 926 or a time before the next multicast/broadcast information 920, 922, 924 can be received on the first frequency. When the UE is not receiving an eMBMS service, the UE may set the latest time to return to the first frequency based on the next paging occasion 926 on the first frequency. When the UE is receiving an eMBMS service, the UE may set the latest time to return to the first frequency based on the next time the multicast/broadcast information 920, 922, 924 can be received on the first frequency. As such, when the UE is receiving an eMBMS service, the UE may need to return sooner to the first frequency in order to receive the SIB13 and all the MCCHs on the first frequency.

Once on the second frequency, the UE acquires the SIB13 912 on the second frequency. Based on the information in the SIB13 912, the UE acquires all the MCCHs 914, 916. The UE checks whether the TMGI and optional session ID is associated with a desired session. A desired session is a session that the user is interested in receiving. If the TMGI and optional session ID is associated with a desired session, the UE stays on the second frequency, performs a tracking area update procedure on the second frequency if the Tracking Area Code is different on the second cell, and prepares to receive the MTCH on the second frequency. If the TMGI and optional session ID is unassociated with a desired session, the UE switches back 918 to the first frequency. The UE may then receive the SIB13 920 and all the MCCHs 922, 924 on the first frequency to discover an eMBMS service on the first frequency. Subsequently, the UE may monitor for the paging message 926.

In the second paging cycle 952, the UE refrains from receiving the SIB13 930 and all the MCCHs 932, 934 on the first frequency of a first cell, and switches 928 to the second frequency of a second cell to acquire the SIB13 936 on the second frequency. Based on the information in the SIB13 936, the UE attempts to acquire all the MCCHs. However, the UE is unable to acquire all the MCCHs (e.g., they are never received or the UE is unable to decode them). To acquire all the MCCHs on the second frequency, the UE may wait until switch back time 944, which is the latest time to switch back to the first frequency in order to monitor the page 946. Alternatively, the UE may wait for the MCCHs only until the switch back time 937, which is the latest time to switch back to the first frequency in order to receive the next multicast/broadcast information 938, 940, 942 on the first frequency. While waiting for all the MCCHs on the second frequency, the UE determines to refrain from receiving the SIB13 938 and all the MCCHs 940, 942 on the first frequency. The UE does not receive all the MCCHs on the second frequency and switches back 944 to the first frequency in order to monitor the next paging occasion 946 for a paging message. In subsequent paging cycles, the UE may continue to switch back and forth between the first and second frequencies in order to monitor for the SIB13 and all the MCCHs on each of the frequencies while still monitoring the paging occasions on the first frequency for a paging message.

In order to enable the method described in relation to FIG. 9, the paging cycle may be set to the largest default paging cycle (e.g., 2.56 seconds) or a paging cycle that is sufficiently large to allow time for the UE to discover eMBMS services on both the first and second frequencies and to monitor paging occasions for paging messages. In addition, the first and second cells may be configured with the same Tracking Area Code. Being configured with the same Tracking Area Code will allow the UE to save some time after switching frequencies, as the UE can avoid performing a tracking area update procedure. In addition, the time periodicity to broadcast the SIB13 may be small so that the UE can have sufficient time to acquire the SIB13 quickly. Further, the MCCH repetition period 954 may be small to allow multiple repetitions of the MCCH per default paging cycle. For example, as shown in FIG. 9, there are two MCCH repetition periods per paging cycle, which allows the UE to monitor a first MCCH repetition period on the second frequency and a second MCCH repetition period on the first frequency. Furthermore, the first and second cells may be synchronized such that the radio frame boundary and System Frame Number (SFN) are synchronous.

Figure 10:
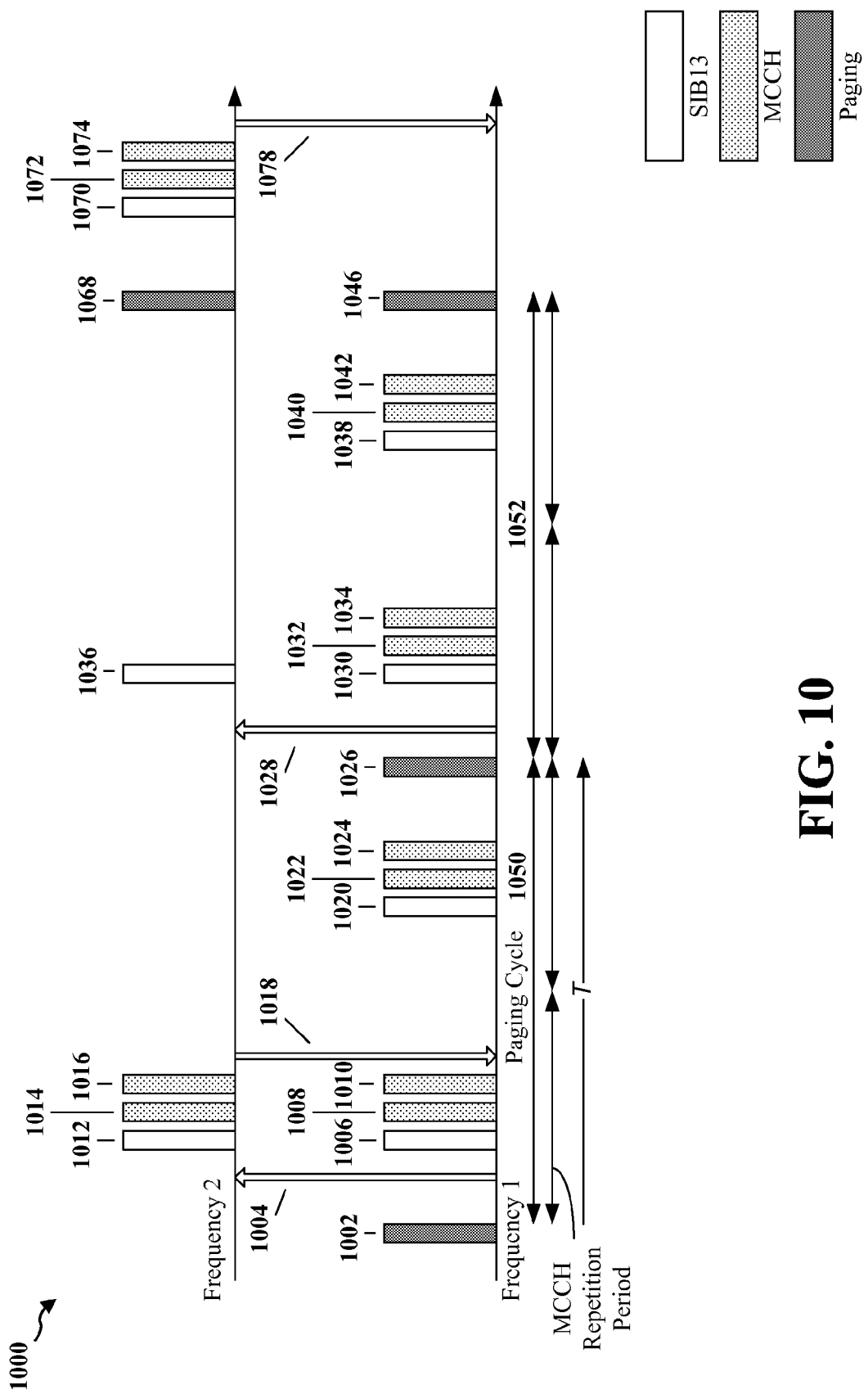
FIG. 10 is a diagram for illustrating another exemplary method of discovering an eMBMS service in LTE.

FIG. 10 is a diagram 1000 for illustrating another exemplary method of discovering an eMBMS service in LTE. In a first paging cycle 1050 after the UE monitors for the paging message 1002 (and a time period T before the starting time of an eMBMS service on the second frequency), the UE refrains from receiving the SIB13 1006 and all the MCCHs 1008, 1010 on the first frequency of a first cell, and switches 1004 to the second frequency of a second cell. Once on the second frequency, the UE acquires the SIB13 1012 on the second frequency. Based on the information in the SIB13 1012, the UE acquires all the MCCHs 1014, 1016. The UE checks whether the TMGI and optional session ID is associated with a desired session. If the TMGI and optional session ID is associated with a desired session, the UE stays on the second frequency, performs a tracking area update procedure on the second frequency if the Tracking Area Code is different on the second cell, and prepares to receive the MTCH on the second frequency. If the TMGI and optional session ID is unassociated with a desired session, the UE switches back 1018 to the first frequency. The UE may then receive the SIB13 1020 and all the MCCHs 1022, 1024 on the first frequency to discover an eMBMS service on the first frequency. Subsequently, the UE may monitor for the paging message 1026.

In the second paging cycle 1052, the UE refrains from receiving the SIB13 1030 and all the MCCHs 1032, 1034 on the first frequency of a first cell, and switches 1028 to the second frequency of a second cell to acquire the SIB13 1036 on the second frequency. Based on the information in the SIB13 1036 on the second frequency, the UE attempts to acquire all the MCCHs. However, as shown in FIG. 10, the UE is unable to acquire all the MCCHs (e.g., they are never received or the UE is unable to decode them). While waiting for all the MCCHs on the second frequency, the UE refrains from receiving the SIB13 1038 and all the MCCHs 1040, 1042 on the first frequency. The UE does not receive all the MCCHs on the second frequency by a time period needed to switch back to the first frequency to monitor the next paging occasion 1046 for a paging message. However, because the second cell is configured with the same Tracking Area Code, the UE may be able to monitor for paging messages for unicast communication on the first frequency while on the second frequency. As such, the UE stays on the second frequency to monitor the paging occasion 1068 for a paging message. Subsequently, the UE receives the SIB13 1070 and all the MCCHs 1072, 1074 on the second frequency. The UE checks whether the TMGI and optional session ID is associated with a desired session. If the TMGI and optional session ID is associated with a desired session, the UE stays on the second frequency and prepares to receive the MTCH on the second frequency. If the TMGI and optional session ID is unassociated with a desired session, the UE switches back 1078 to the first frequency.

As discussed supra, if the UE is receiving an eMBMS service on the first frequency, the UE needs to monitor the SIB13 and all the MCCHs on the first frequency. If at some point, the current time is beyond the start time of the eMBMS service and all the MCCHs do not include a TMGI and an optional session ID that is associated with a desired session, the UE may indicate to the user that the new eMBMS service should be on the second frequency. If the UE no longer receives the eMBMS service and is in an RRC_IDLE state, the UE may switch to the second frequency to acquire the SIB13 and all the MCCHs on the second frequency, and when the TMGI and an optional session ID are associated with a desired session, the MTCH.

For purposes of illustration, FIGS. 9, 10 are shown with two MCCHs (MBSFNAreaConfiguration messages) per MCCH repetition period, but there may be a different number of MCCHs.

Figure 11:
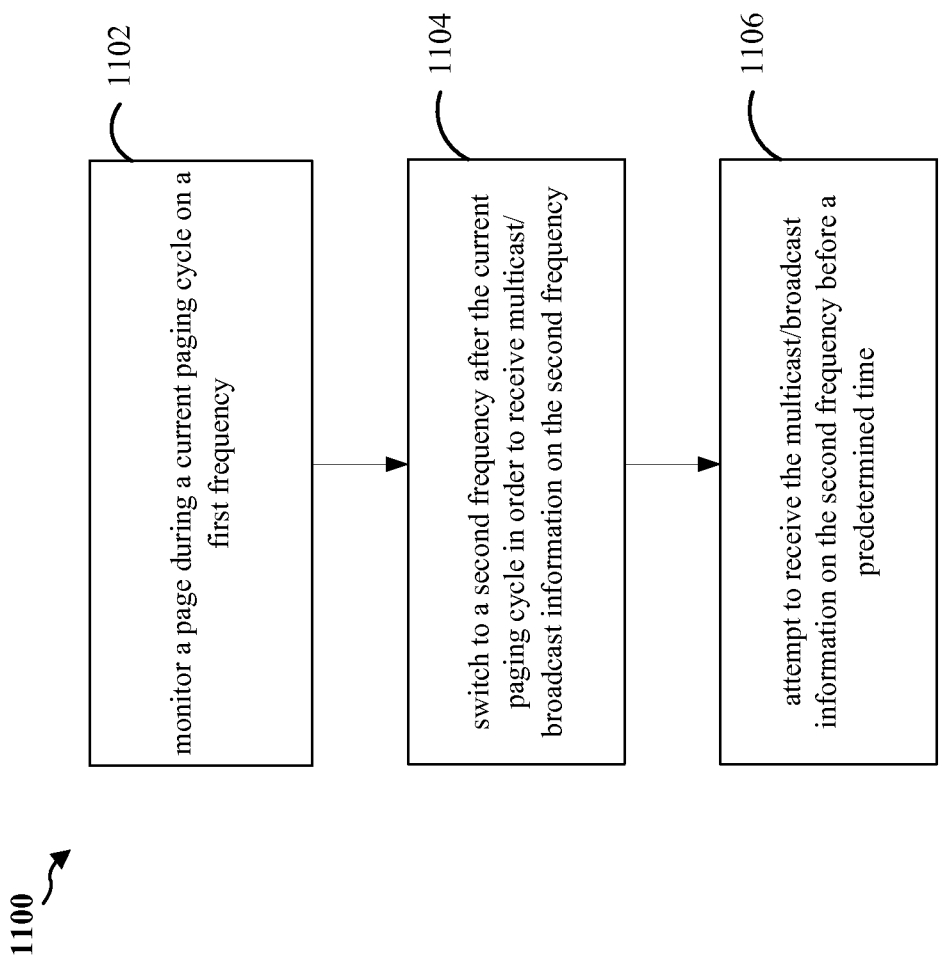
FIG. 11 is a flow chart of a first method of wireless communication.

FIG. 11 is a flow chart 1100 of a first method of wireless communication. The method may be performed by a UE. In step 1102, the UE monitors a page during a current paging cycle on a first frequency. In step 1104, the UE switches to a second frequency after the current paging cycle to receive multicast/broadcast information on the second frequency. In step 1106, the UE attempts to receive the multicast/broadcast information on the second frequency before a predetermined time. For example, referring to FIG. 9, the UE monitors the page 902 during a paging cycle previous to the paging cycle 950, switches 904 to the second frequency during the paging cycle 950, and attempts to receive the multicast/broadcast information 912, 914, 916 before a predetermined time for switching back to the first frequency either to monitor for the page 926 on the first frequency or to receive the multicast/broadcast information 920, 922, 924 on the first frequency.

The predetermined time may be an earliest time in which at least one of the page can be received in a subsequent paging cycle on the first frequency or multicast/broadcast information can be received on the first frequency. For example, when the UE is receiving an eMBMS service on the first frequency, the UE may set the predetermined time to an earliest time in which multicast/broadcast information can be received on the first frequency. However, if the UE is not receiving an eMBMS service on the first frequency, the UE may set the predetermined time to an earliest time in which the page can be received in a subsequent paging cycle on the first frequency. Of course, when the UE is not receiving an eMBMS service on the first frequency, the UE may set the predetermined time to an earliest time in which multicast/broadcast information can be received on the first frequency so as not to miss an eMBMS discovery opportunity on the first frequency.

The multicast/broadcast information may include system information and control information. The system information may be a SIB, and the control information may include a multicast/broadcast area configuration message (e.g., MBSFNAreaConfiguration) associated with an eMBMS service. The multicast/broadcast area configuration message may be received on an MCCH. A repetition period of the MCCH may be less than half a paging cycle equal to a time difference between a start of a subsequent paging cycle and a start of the current paging cycle (therefore allowing for two or more MCCHs each paging cycle). The paging cycle may be set to a largest default paging cycle (e.g., approximately 2.56 seconds). A radio frame boundary and a system frame number (SFN) may be synchronous on the first frequency and the second frequency.

Figure 12:
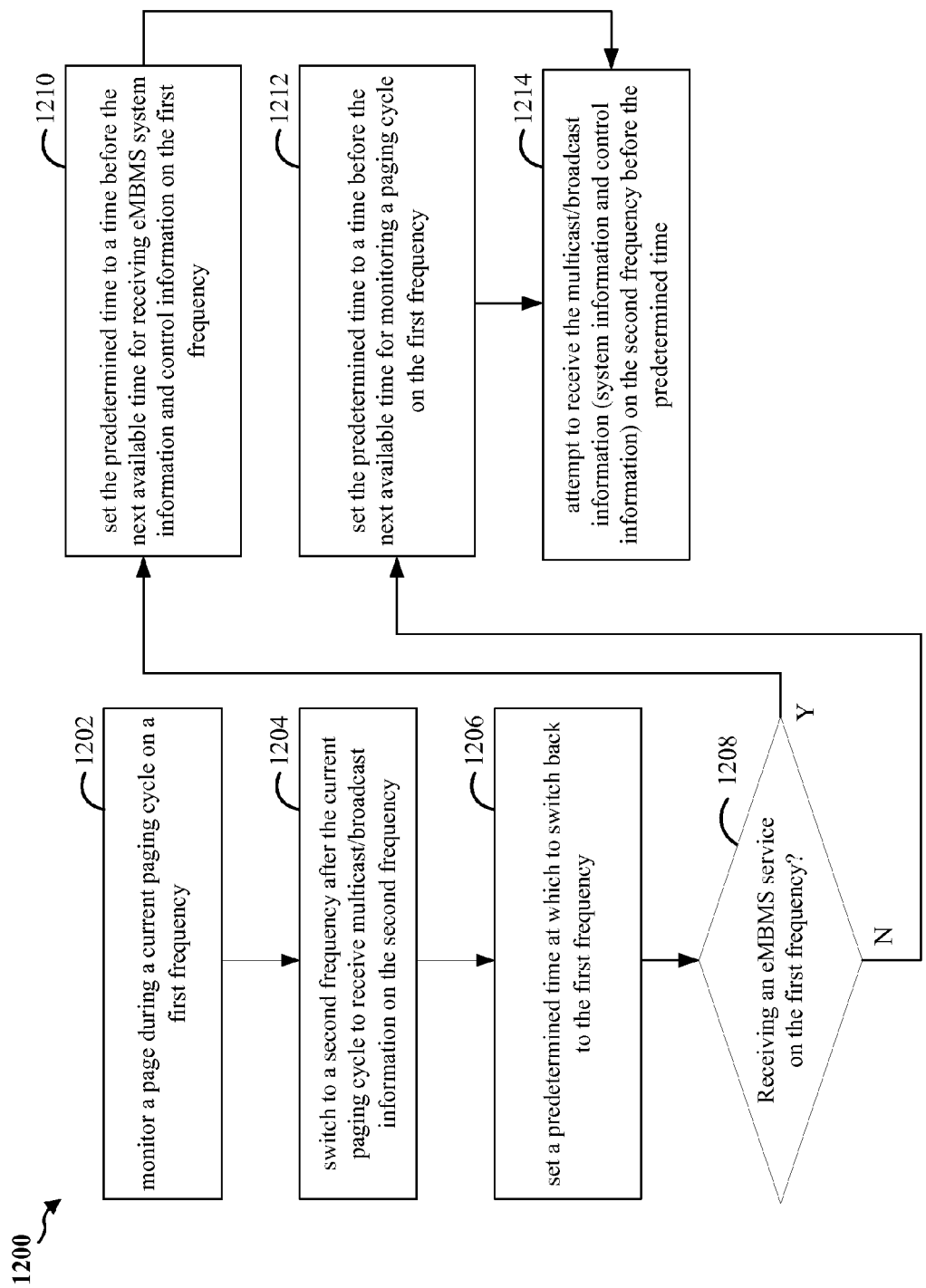
FIG. 12 is a flow chart of a second method of wireless communication.

FIG. 12 is a flow chart 1200 of a second method of wireless communication. The method may be performed by a UE. In step 1202, the UE monitors a page during a current paging cycle on a first frequency. In step 1204, the UE switches to a second frequency after the current paging cycle to receive multicast/broadcast information on the second frequency. In step 1206, the UE sets a predetermined time at (or time period after) which the UE switches back to the first frequency. In step 1208, if the UE is currently receiving an eMBMS service, in step 1210, the UE may set the predetermined time to a time before the next available time for receiving eMBMS system information and control information on the first frequency. In step 1208, if the UE is not currently receiving an eMBMS service, in step 1212, the UE may set the predetermined time to a time before the next available time for monitoring a paging cycle on the first frequency. After steps 1210/1212, in step 1214, the UE attempts to receive the multicast/broadcast information on the second frequency before the predetermined time. For example, referring to FIG. 9, the UE monitors the page 902 during a paging cycle previous to the paging cycle 950, switches 904 to the second frequency during the paging cycle 950, and sets a predetermined time for switching back to the first frequency. If the UE is not receiving an eMBMS service on the first frequency, the UE may set the predetermined time in order to monitor for the page 926 on the first frequency. If the UE is receiving an eMBMS service on the first frequency, the UE may set the predetermined time in order to receive the multicast/broadcast information 920, 922, 924 on the first frequency. Subsequently, the UE attempts to receive the multicast/broadcast information 912, 914, 916 before the predetermined time for switching back to the first frequency either to monitor for the page 926 on the first frequency or to receive the multicast/broadcast information 920, 922, 924 on the first frequency.

Figure 13:
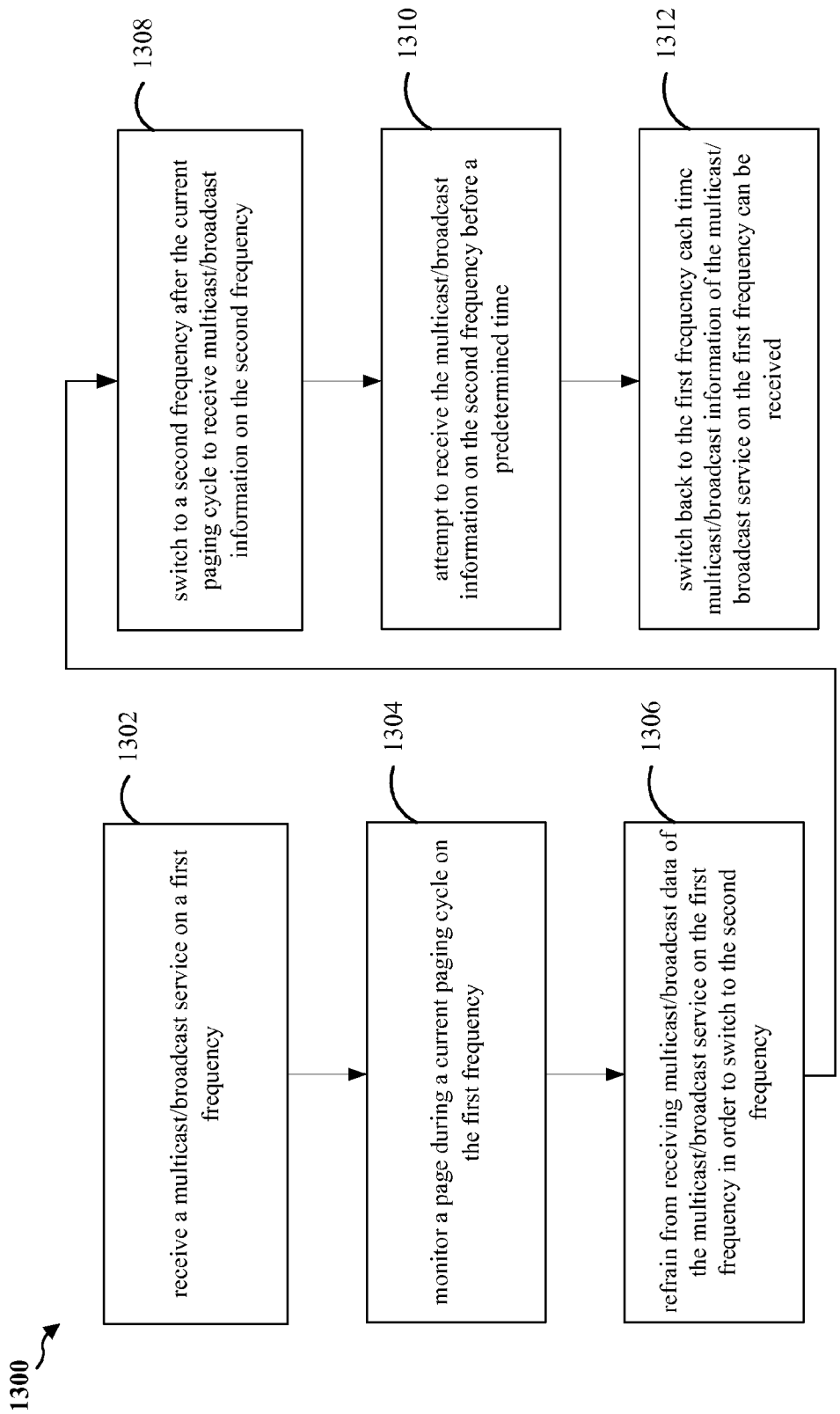
FIG. 13 is a flow chart of a third method of wireless communication.

FIG. 13 is a flow chart 1300 of a third method of wireless communication. The method may be performed by a UE. In step 1302, the UE receives a multicast/broadcast service on the first frequency. In step 1304, the UE monitors a page during a current paging cycle on a first frequency. In step 1306, the UE may refrain from receiving multicast/broadcast data of the multicast/broadcast service on the first frequency in order to switch to the second frequency. In step 1308, the UE may switch to a second frequency after the current paging cycle to receive multicast/broadcast information on the second frequency. In step 1310, the UE may attempt to receive the multicast/broadcast information on the second frequency before a predetermined time. In step 1312, the UE may switch back to the first frequency each time multicast/broadcast information of the multicast/broadcast service on the first frequency can be received. For example, assume the UE for FIG. 9 is receiving an eMBMS service on the first frequency. Referring to FIG. 9, the UE monitors the page 926 during the paging cycle 950; refrains from receiving multicast/broadcast data on the first frequency in order to switch 928 to the second frequency; switches 928 to the second frequency during the paging cycle 952 to receive the multicast/broadcast information; attempts to receive the multicast/broadcast information (only SIB13 936 is received or successfully decoded) before a predetermined time at which the UE must switch back 937 to the first frequency to receive the multicast/broadcast information 938, 940, 942; and switches back 937 to the first frequency in order to receive the multicast/broadcast information 938, 940, 942.

Figure 14:
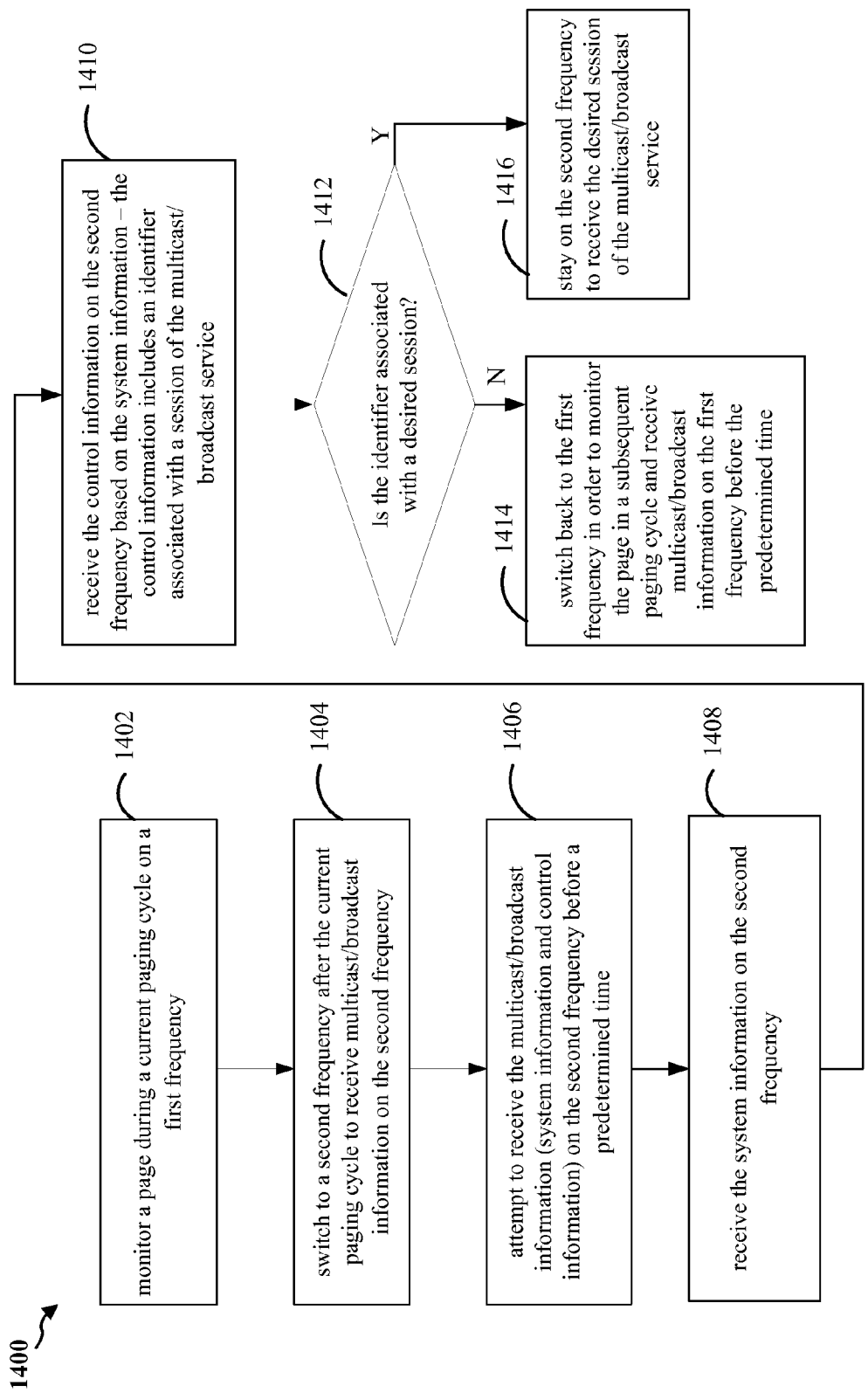
FIG. 14 is a flow chart of a fourth method of wireless communication.

FIG. 14 is a flow chart 1400 of a fourth method of wireless communication. The method may be performed by a UE. In step 1402, the UE monitors a page during a current paging cycle on a first frequency. In step 1404, the UE may switch to a second frequency after the current paging cycle to receive multicast/broadcast information on the second frequency. In step 1406, the UE may attempt to receive the multicast/broadcast information on the second frequency before a predetermined time. The multicast/broadcast information may include system information (e.g., SIB13) and control information (e.g., MBSFNAreaConfiguration message on the MCCH) related to a multicast/broadcast service. In step 1408, the UE may receive the system information on the second frequency. In step 1410, the UE may receive the control information on the second frequency based on the system information. The control information may include an identifier associated with a session of the multicast/broadcast service. In step 1412, the UE may determine whether the identifier is associated with a desired session. When the identifier is unassociated with the desired session, in step 1414, the UE may switch back to the first frequency in order to monitor the page in a subsequent paging cycle and receive multicast/broadcast information on the first frequency before the predetermined time. When the identifier is associated with the desired session, in step 1416, the UE may stay on the second frequency to receive the desired session of the multicast/broadcast service.

For example, referring to FIG. 9, the UE monitors a page 902 during a paging cycle previous to the paging cycle 950 on a first frequency. The UE switches 904 to a second frequency during the paging cycle 950 to receive multicast/broadcast information 912, 914, 916 on the second frequency. The UE attempts to receive the multicast/broadcast information 912, 914, 916 on the second frequency before a predetermined time. The UE receives the system information SIB13 912 on the second frequency. The UE receives the control information MCCHs 914, 916 on the second frequency based on the system information SIB13 912. The UE determines whether the identifier (e.g., TMGI and optional session ID) recovered from the MCCHs 914, 916 is associated with a desired session. When the identifier is unassociated with the desired session, the UE switches back 918 to the first frequency in order to monitor the page 926 in the paging cycle 950 and receive multicast/broadcast information 920, 922, 924 on the first frequency before the predetermined time. If the identifier is associated with the desired session, the UE may stay on the second frequency to receive the desired session of the multicast/broadcast service.

Figure 15:
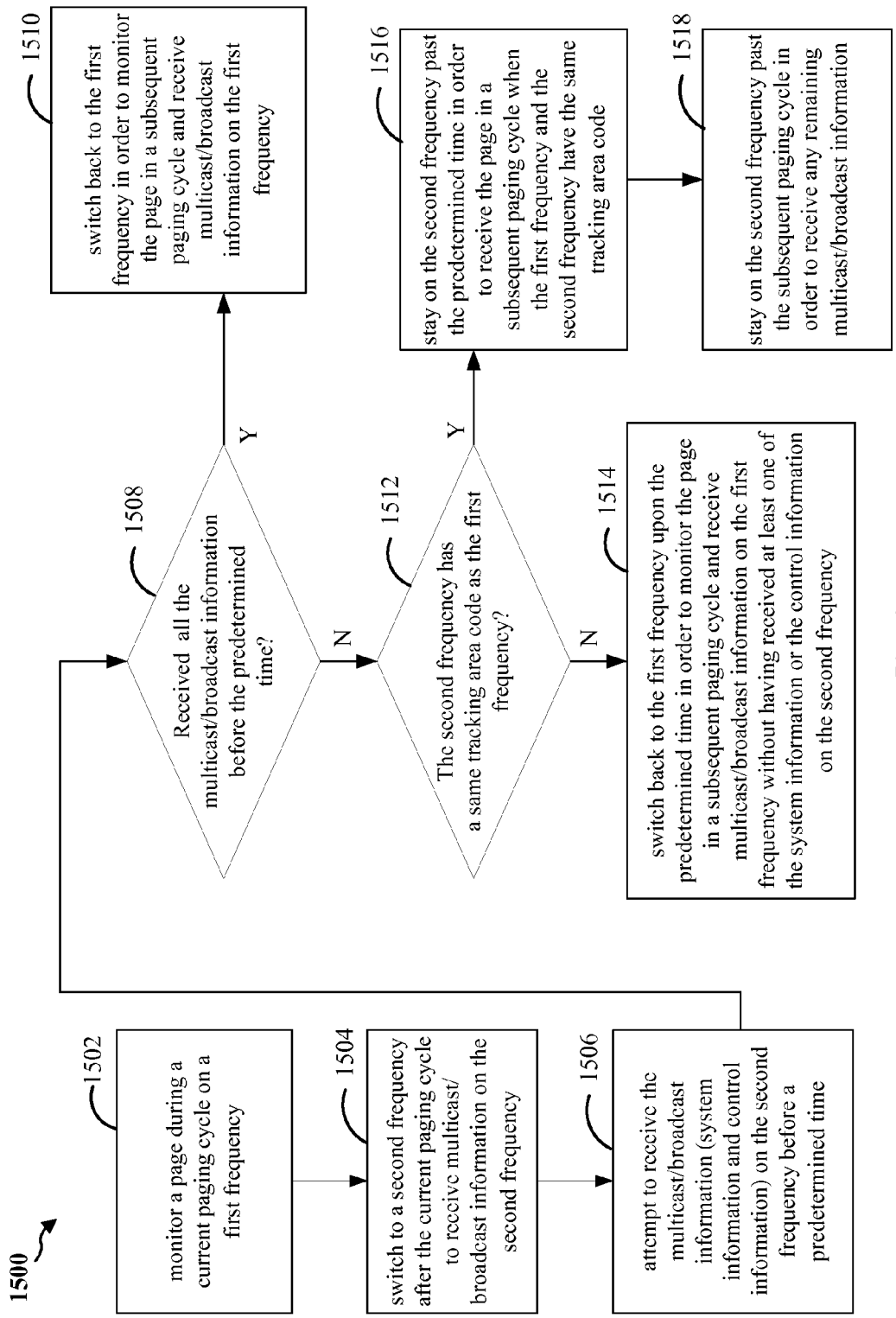
FIG. 15 is a flow chart of a fifth method of wireless communication.

FIG. 15 is a flow chart 1500 of a fifth method of wireless communication. The method may be performed by a UE. In step 1502, the UE monitors a page during a current paging cycle on a first frequency. In step 1504, the UE may switch to a second frequency after the current paging cycle to receive multicast/broadcast information on the second frequency. In step 1506, the UE may attempt to receive the multicast/broadcast information on the second frequency before a predetermined time. The multicast/broadcast information may include system information and control information related to a multicast/broadcast service. In step 1508, the UE may determine whether all the multicast/broadcast information has been received before the predetermined time. If in step 1508 the UE determines that not all the multicast/broadcast information has been received before the predetermined time, in step 1512, the UE may determine whether the second frequency has the same tracking area code as the first frequency. If in step 1512 the UE determines that the second frequency does not have the same tracking area code as the first frequency, in step 1514, the UE may switch back to the first frequency upon the predetermined time in order to monitor the page in a subsequent paging cycle and receive multicast/broadcast information on the first frequency without having received at least one of the system information or the control information on the second frequency.

For example, referring to FIG. 9, the UE monitors a page 926 during a current paging cycle 950 on a first frequency. The UE switches to a second frequency after the current paging cycle 950 to receive multicast/broadcast information on the second frequency. The UE attempts to receive the multicast/broadcast information on the second frequency before a predetermined time. However, the UE only receives the SIB13 936 on the second frequency. The UE switches back (937 or 944) to the first frequency upon the predetermined time in order to monitor the page 946 in a subsequent paging cycle 952 and/or receive multicast/broadcast information 938, 940, 942 on the first frequency without having received at least one of the system information or the control information on the second frequency.

If in step 1508 the UE determines that all the multicast/broadcast information has been received before the predetermined time, in step 1510, the UE may switch back to the first frequency in order to monitor the page in a subsequent paging cycle and receive multicast/broadcast information on the first frequency. For example, referring to FIG. 10, the UE monitors a page 1002 on a first frequency during a paging cycle previous to the paging cycle 1050. The UE switches 1004 to a second frequency during the paging cycle 1050 to receive multicast/broadcast information 1012, 1014, 1016 on the second frequency. The UE attempts to receive the multicast/broadcast information 1012, 1014, 1016 on the second frequency before a predetermined time. The UE receives the multicast/broadcast information 1012, 1014, 1016 on the second frequency before a predetermined time and determines that an identified session in the multicast/broadcast information is not desired for streaming or download. The UE switches back 1018 to the first frequency in order to monitor the page 1026 in the paging cycle 1050 and receive multicast/broadcast information 1020, 1022, 1024 on the first frequency.

If in step 1512 the UE determines that the second frequency does have the same tracking area code as the first frequency, in step 1516, the UE may stay on the second frequency past the predetermined time in order to receive the page in a subsequent paging cycle. In step 1518, the UE may stay on the second frequency past the subsequent paging cycle in order to receive any remaining multicast/broadcast information. For example, referring to FIG. 10, the UE monitors a page 1026 during a current paging cycle 1050 on a first frequency. The UE switches 1028 to a second frequency after the current paging cycle 1050 to receive multicast/broadcast information on the second frequency. The UE attempts to receive the multicast/broadcast information on the second frequency before a predetermined time. However, the UE only receives or successfully decodes the SIB13 1036 on the second frequency. The UE determines that all the multicast/broadcast information cannot be received before the predetermined time. The UE then determines that the second frequency has the same tracking area code as the first frequency. The UE decides to stay on the second frequency past the predetermined time in order to receive the page 1068 in a subsequent paging cycle 1052. The UE stays on the second frequency past the subsequent paging cycle 1052 in order to receive any remaining multicast/broadcast information 1070, 1072, 1074.

Figure 16:
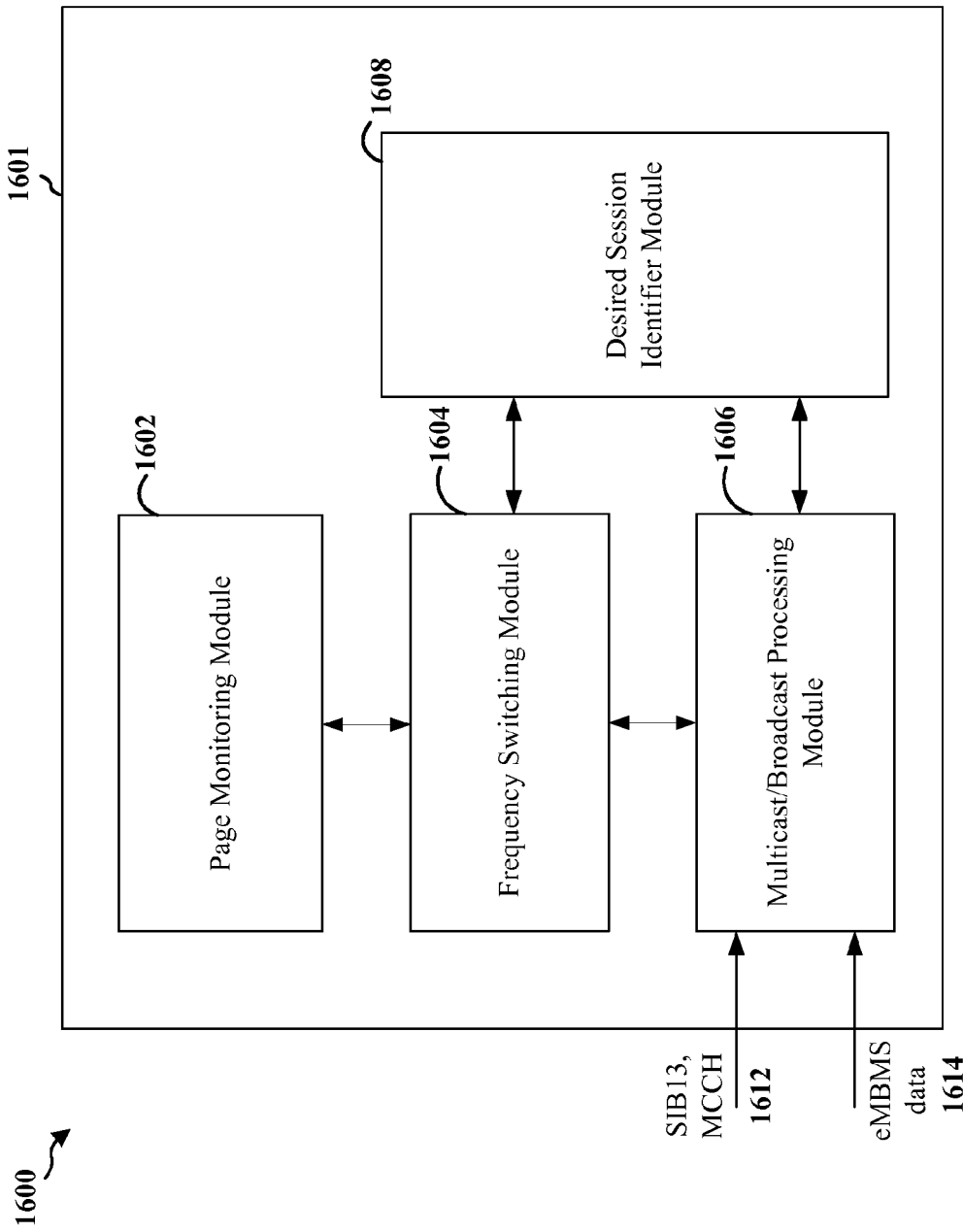
FIG. 16 is a conceptual data flow diagram illustrating the data flow between different modules/means/components in an exemplary apparatus.

FIG. 16 is a conceptual data flow diagram 1600 illustrating the data flow between different modules/means/components in an exemplary apparatus 1601. The apparatus may include a page monitoring module 1602 that is configured to monitor a page during a current paging cycle on a first frequency. The apparatus may further include a frequency switching module 1604 that is configured to switch to a second frequency after the current paging cycle to receive multicast/broadcast information on the second frequency. The apparatus may further include a multicast/broadcast processing module 1606 that is configured to attempt to receive the multicast/broadcast information 1612 on the second frequency before a predetermined time. The predetermined time may be an earliest time in which at least one of the page can be received in a subsequent paging cycle on the first frequency or multicast/broadcast information can be received on the first frequency.

The multicast/broadcast processing module 1606 may be configured to receive a multicast/broadcast service on the first frequency. In addition, the multicast/broadcast processing module 1606 may be configured to refrain from receiving multicast/broadcast data 1614 of the multicast/broadcast service on the first frequency in order to switch to the second frequency. Furthermore, the frequency switching module 1604 may be configured to switch back to the first frequency each time multicast/broadcast information of the multicast/broadcast service on the first frequency can be received.

The multicast/broadcast processing module 1606 may be configured to receive the system information on the second frequency. In addition, the multicast/broadcast processing module 1606 may be configured to receive the control information on the second frequency based on the system information. The control information may include an identifier associated with a session of the multicast/broadcast service. The multicast/broadcast processing module 1606 may provide the identifier to a desired session identifier module 1608 that may be configured to determine whether the identifier is associated with a desired session. When the identifier is unassociated with the desired session, the frequency switching module 1604 may be configured to switch back to the first frequency in order to monitor the page in a subsequent paging cycle and receive multicast/broadcast information on the first frequency before the predetermined time. When the identifier is associated with the desired session, the frequency switching module 1604 may be configured to stay on the second frequency to receive the desired session of the multicast/broadcast service.

The frequency switching module 1604 may be configured to switch back to the first frequency upon the predetermined time in order to monitor the page in a subsequent paging cycle and receive multicast/broadcast information on the first frequency without having received at least one of the system information or the control information on the second frequency. The frequency switching module 1604 may be configured to switch back to the first frequency in order to monitor the page in a subsequent paging cycle and receive multicast/broadcast information on the first frequency.

The multicast/broadcast processing module 1606 may be configured to determine whether all the multicast/broadcast information cannot be received before the predetermined time. In addition, the multicast/broadcast processing module 1606 may be configured to determine whether the second frequency has a same tracking area code as the first frequency when all the multicast/broadcast information cannot be received before the predetermined time. In addition, the frequency switching module 1604 may be configured to stay on the second frequency past the predetermined time in order to receive the page in a subsequent paging cycle when the first frequency and the second frequency have the same tracking area code. Furthermore, the frequency switching module 1604 may be configured to stay on the second frequency past the subsequent paging cycle in order to receive any remaining multicast/broadcast information.

The apparatus may include additional modules that perform each of the steps of the algorithm in the aforementioned flow charts. As such, each step in the aforementioned flow charts may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 17:
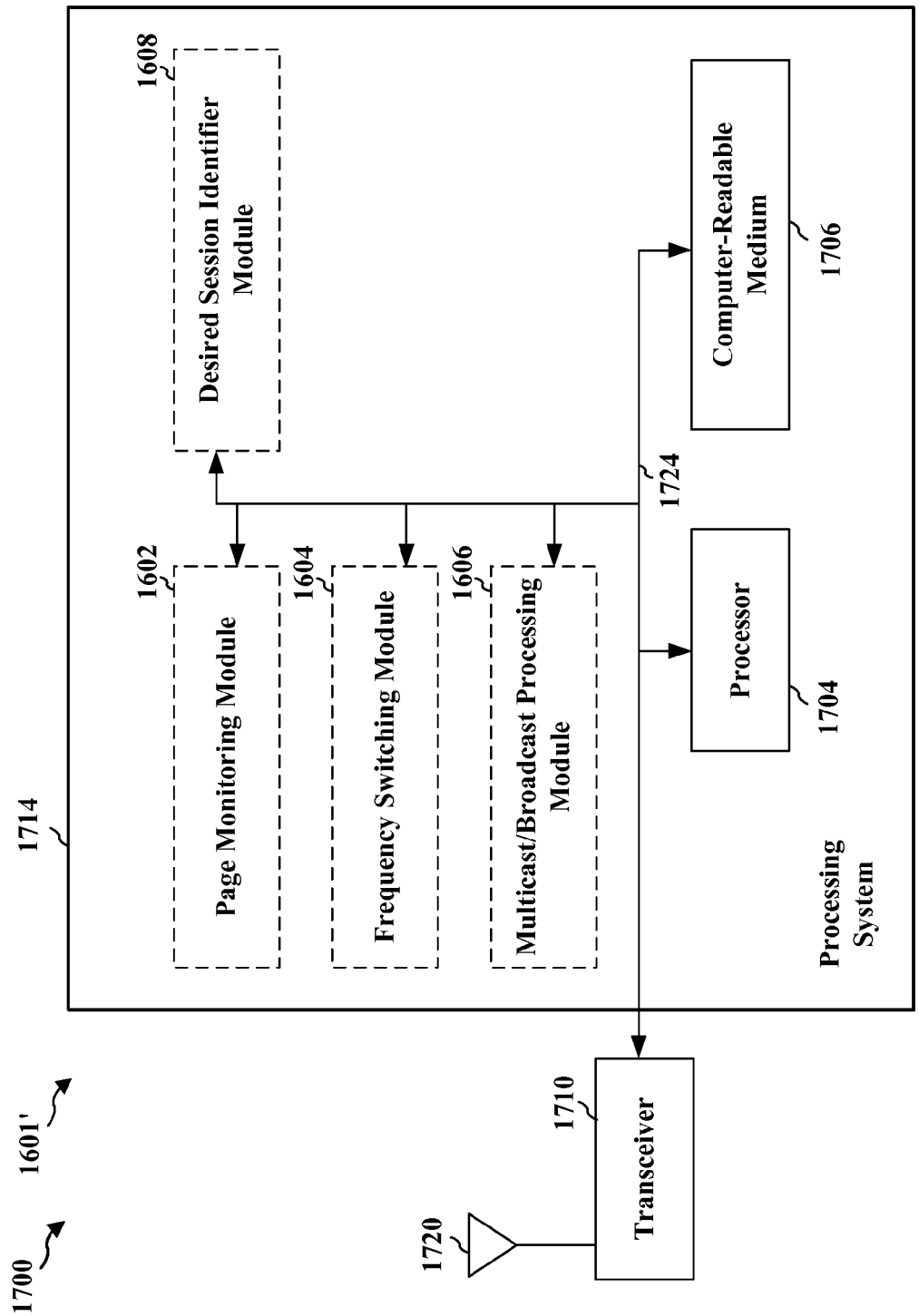
FIG. 17 is a diagram illustrating an example of a hardware implementation for an apparatus employing a processing system.

FIG. 17 is a diagram 1700 illustrating an example of a hardware implementation for an apparatus 1601' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1704, the modules 1602, 1604, 1606, 1608, and the computer-readable medium 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The processing system 1714 includes a processor 1704 coupled to a computer-readable medium 1706. The processor 1704 is responsible for general processing, including the execution of software stored on the computer-readable medium 1706. The software, when executed by the processor 1704, causes the processing system 1714 to perform the various functions described supra for any particular apparatus. The computer-readable medium 1706 may also be used for storing data that is manipulated by the processor 1704 when executing software. The processing system further includes modules 1602, 1604, 1606, and 1608. The modules may be software modules running in the processor 1704, resident/stored in the computer readable medium 1706, one or more hardware modules coupled to the processor 1704, or some combination thereof. The processing system 1714 may be a component of the UE 650 and may include the memory 660 and/or at least one of the TX processor 668, the RX processor 656, and the controller/processor 659.

In one configuration, the apparatus 1601/1601' for wireless communication includes means for monitoring a page during a current paging cycle on a first frequency, means for switching to a second frequency after the current paging cycle to receive multicast/broadcast information on the second frequency, and means for attempting to receive the multicast/broadcast information on the second frequency before a predetermined time. The apparatus may further include means for receiving a multicast/broadcast service on the first frequency, means for refraining to receive multicast/broadcast data of the multicast/broadcast service on the first frequency in order to switch to the second frequency, and means for switching back to the first frequency each time multicast/broadcast information of the multicast/broadcast service on the first frequency can be received. The apparatus may further include means for receiving the system information on the second frequency, means for receiving the control information on the second frequency based on the system information in which the control information includes an identifier associated with a session of the multicast/broadcast service, and means for determining whether the identifier is associated with a desired session. The apparatus may further include means for switching back to the first frequency upon the predetermined time in order to monitor the page in a subsequent paging cycle and receive multicast/broadcast information on the first frequency without having received at least one of the system information or the control information on the second frequency. The apparatus may further include means for switching back to the first frequency in order to monitor the page in a subsequent paging cycle and receive multicast/broadcast information on the first frequency. The apparatus may further include means for determining whether all the multicast/broadcast information cannot be received before the predetermined time, means for determining whether the second frequency has a same tracking area code as the first frequency when all the multicast/broadcast information cannot be received before the predetermined time, means for staying on the second frequency past the predetermined time in order to receive the page in a subsequent paging cycle when the first frequency and the second frequency have the same tracking area code, and means for staying on the second frequency past the subsequent paging cycle in order to receive any remaining multicast/broadcast information. The aforementioned means may be one or more of the aforementioned modules of the apparatus 1601 and/or the processing system 1714 of the apparatus 1601' configured to perform the functions recited by the aforementioned means. As described supra, the processing system 1714 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
monitoring a page during a current paging cycle on a first radio frequency;
switching to a second radio frequency after the current paging cycle in order to receive multicast/broadcast information on the second frequency;
attempting to receive the multicast/broadcast information on the second frequency before a predetermined time; and
switching back to the first frequency in order to monitor the page in a subsequent paging cycle and receive multicast/broadcast information on the first frequency,
wherein the multicast/broadcast information comprises system information and control information, the system information comprises a system information block (SIB), and the control information comprises a multicast/broadcast area configuration message associated with an evolved Multicast Broadcast Multimedia Service (eMBMS),
wherein the multicast/broadcast area configuration message is received on a multicast control channel (MCCH), and
wherein a repetition period of the MCCH is less than half a paging cycle equal to a time difference between a start of the subsequent paging cycle and a start of the current paging cycle.

2. The method of claim 1, wherein the predetermined time is an earliest time in which at least one of the page can be received in the subsequent paging cycle on the first frequency or the multicast/broadcast information can be received on the first frequency.

3. The method of claim 2, further comprising:
receiving a multicast/broadcast service on the first frequency;
refraining to receive multicast/broadcast data of the multicast/broadcast service on the first frequency in order to switch to the second frequency; and
switching back to the first frequency each time the multicast/broadcast information of the multicast/broadcast service on the first frequency can be received.

4. The method of claim 1, wherein the multicast/broadcast information comprises system information and control information related to a multicast/broadcast service, and the method further comprises:
receiving the system information on the second frequency;
receiving the control information on the second frequency based on the system information, the control information including an identifier associated with a session of the multicast/broadcast service; and
determining whether the identifier is associated with a desired session.

5. The method of claim 4, wherein when the identifier is unassociated with the desired session, the method further comprises switching back to the first frequency in order to monitor the page in the subsequent paging cycle and receive the multicast/broadcast information on the first frequency before the predetermined time.

6. The method of claim 4, wherein when the identifier is associated with the desired session, the method further comprises staying on the second frequency to receive the desired session of the multicast/broadcast service.

7. The method of claim 1, wherein the multicast/broadcast information comprises system information and control information related to a multicast/broadcast service, and the method further comprises switching back to the first frequency upon the predetermined time in order to monitor the page in the subsequent paging cycle and receive the multicast/broadcast information on the first frequency without having received at least one of the system information or the control information on the second frequency.

8. The method of claim 1, wherein the paging cycle is set to a largest default paging cycle.

9. The method of claim 1, wherein the method is performed by a user equipment (UE) in an idle state while not receiving a multicast/broadcast service.

10. The method of claim 1, wherein a radio frame boundary and a system frame number (SFN) are synchronous on the first frequency and the second frequency.

11. An apparatus for wireless communication, comprising:
means for monitoring a page during a current paging cycle on a first radio frequency;
means for switching to a second radio frequency after the current paging cycle to receive multicast/broadcast information on the second frequency;
means for attempting to receive the multicast/broadcast information on the second frequency before a predetermined time; and
means for switching back to the first frequency in order to monitor the page in a subsequent paging cycle and receive multicast/broadcast information on the first frequency,
wherein the multicast/broadcast information comprises system information and control information, the system information comprises a system information block (SIB), and the control information comprises a multicast/broadcast area configuration message associated with an evolved Multicast Broadcast Multimedia Service (eMBMS),
wherein the multicast/broadcast area configuration message is received on a multicast control channel (MCCH), and
wherein a repetition period of the MCCH is less than half a paging cycle equal to a time difference between a start of the subsequent paging cycle and a start of the current paging cycle.

12. The apparatus of claim 11, wherein the predetermined time is an earliest time in which at least one of the page can be received in the subsequent paging cycle on the first frequency or the multicast/broadcast information can be received on the first frequency.

13. The apparatus of claim 12, further comprising:
means for receiving a multicast/broadcast service on the first frequency;
means for refraining to receive multicast/broadcast data of the multicast/broadcast service on the first frequency in order to switch to the second frequency; and
means for switching back to the first frequency each time the multicast/broadcast information of the multicast/broadcast service on the first frequency can be received.

14. The apparatus of claim 11, wherein the multicast/broadcast information comprises system information and control information related to a multicast/broadcast service, and the apparatus further comprises:
means for receiving the system information on the second frequency;
means for receiving the control information on the second frequency based on the system information, the control information including an identifier associated with a session of the multicast/broadcast service; and
means for determining Whether the identifier is associated with a desired session.

15. The apparatus of claim 14, wherein when the identifier is unassociated with the desired session, the means for switching switches back to the first frequency in order to monitor the page in the subsequent paging cycle and receive the multicast/broadcast information on the first frequency before the predetermined time.

16. The apparatus of claim 14, wherein when the identifier is associated with the desired session, the means for switching stays on the second frequency to receive the desired session of the multicast/broadcast service.

17. The apparatus of claim 11, wherein the multicast/broadcast information comprises system information and control information related to a multicast/broadcast service, and the apparatus further comprises means for switching back to the first frequency upon the predetermined time in order to monitor the page in the subsequent paging cycle and receive the multicast/broadcast information on the first frequency without having received at least one of the system information or the control information on the second frequency.

18. The apparatus of claim 11, wherein the paging cycle is set to a largest default paging cycle.

19. The apparatus of claim 11, wherein the apparatus is a user equipment (UE) that is in an idle state while not receiving a multicast/broadcast service.

20. The apparatus of claim 11, wherein a radio frame boundary and a system frame number (SFN) are synchronous on the first frequency and the second frequency.

21. An apparatus for wireless communication, comprising:
a memory; and
a processing system coupled to the memory and configured to:
monitor a page during a current paging cycle on a first radio frequency;
switch to a second radio frequency after the current paging cycle to receive multicast/broadcast information on the second frequency;
attempt to receive the multicast/broadcast information on the second frequency before a predetermined time; and
switch back to the first frequency in order to monitor the page in a subsequent paging cycle and receive multicast/broadcast information on the first frequency,
wherein the multicast/broadcast information comprises system information and control information, the system information comprises a system information block (SIB), and the control information comprises a multicast/broadcast area configuration message associated with an evolved Multicast Broadcast Multimedia Service (eMBMS),
wherein the multicast/broadcast area configuration message is received on a multicast control channel (MCCH), and
wherein a repetition period of the MCCH is less than half a paging cycle equal to a time difference between a start of the subsequent paging cycle and a start of the current paging cycle.

22. The apparatus of claim 21, wherein the predetermined time is an earliest time in which at least one of the page can be received in the subsequent paging cycle on the first frequency or the multicast/broadcast information can be received on the first frequency.

23. The apparatus of claim 22, wherein the processing system is further configured to:
receive a multicast/broadcast service on the first frequency;
refrain to receive multicast/broadcast data of the multicast/broadcast service on the first frequency in order to switch to the second frequency; and
switch back to the first frequency each time the multicast/broadcast information of the multicast/broadcast service on the first frequency can be received.

24. The apparatus of claim 21, wherein the multicast/broadcast information comprises system information and control information related to a multicast/broadcast service, and the processing system is further configured to:
receive the system information on the second frequency;
receive the control information on the second frequency based on the system information, the control information including an identifier associated with a session of the multicast/broadcast service; and
determine whether the identifier is associated with a desired session.

25. The apparatus of claim 24, wherein when the identifier is unassociated with the desired session, the processing system is further configured to switch back to the first frequency in order to monitor the page in the subsequent paging cycle and receive the multicast/broadcast information on the first frequency before the predetermined time.

26. The apparatus of claim 24, wherein when the identifier is associated with the desired session, the processing system is further configured to stay on the second frequency to receive the desired session of the multicast/broadcast service.

27. The apparatus of claim 21, wherein the multicast/broadcast information comprises system information and control information related to a multicast/broadcast service, and the processing system is further configured to switch back to the first frequency upon the predetermined time in order to monitor the page in the subsequent paging cycle and receive the multicast/broadcast information on the first frequency without having received at least one of the system information or the control information on the second frequency.

28. The apparatus of claim 21, wherein the paging cycle is set to a largest default paging cycle.

29. The apparatus of claim 21, wherein the apparatus is a user equipment (UE) that is in an idle state while not receiving a multicast/broadcast service.

30. The apparatus of claim 21, wherein a radio frame boundary and a system frame number (SFN) are synchronous on the first frequency and the second frequency.

31. A non-transitory computer-readable medium storing computer executable code for wireless communication, comprising code for:
monitoring a page during a current paging cycle on a first radio frequency;
switching to a second radio frequency after the current paging cycle to receive multicast/broadcast information on the second frequency;
attempting to receive the multicast/broadcast information on the second frequency before a predetermined time: and
switching back to the first frequency in order to monitor the page in a subsequent paging cycle and receive multicast/broadcast information on the first frequency,
wherein the multicast/broadcast information comprises system information and control information, the s stem information comprises a system information block (SIB), and the control information comprises a multicast/broadcast area configuration message associated with an evolved Multicast Broadcast Multimedia Service (eMBMS),
wherein multicast/broadcast area configuration message is received on a multicast control channel (MCCH), and
wherein a repetition period of the MCCH is less than half a paging cycle equal to a time difference between a start of the subsequent paging cycle and a start of the current paging cycle.

* * * * *